US009100891B2

(12) United States Patent
Zheng et al.

(10) Patent No.: US 9,100,891 B2
(45) Date of Patent: Aug. 4, 2015

(54) FEMTOCELL FINGERPRINTING (71) Applicant: Broadcom Corporation, Irvine, CA (US)

(72) Inventors: Dong Zheng, Sunnyvale, CA (US); Vikram Shantveer Mhetre, San Jose, CA (US); Sudip Alexei Gupta, Hemel Hempstead (GB); Sagar Nargundkar, Scotch Plains, NJ (US); Yuan Liu, Holmdel, NJ (US); Sridhar Prakasam, Morganville, NJ (US); Sultan Budhwani, Laurence Harbor, NJ (US); Sandeep Sarthavalli Ramesh, Bracknell (GB); Abhishek Pandit, Wokingham (GB); Odile Rollinger, Maidenhead (GB); Mojan Mohajer, Woking (GB); Soma Majumdar, Bangalore (IN); Aniruddha Subhash Diwan, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/146,315

(22) Filed: Jan. 2, 2014

(65) Prior Publication Data

US 2015/0024760 A1    Jan. 22, 2015

Related U.S. Application Data

(60) Provisional application No. 61/900,473, filed on Nov. 6, 2013, provisional application No. 61/847,237, filed on Jul. 17, 2013, provisional application No. 61/859,874, filed on Jul. 30, 2013, provisional application No. 61/867,298, filed on Aug. 19, 2013.

(51) Int. Cl.
| | | |
|---|---|---|
| *H04W 36/00* | (2009.01) | |
| *H04W 36/30* | (2009.01) | |
| *H04W 84/04* | (2009.01) | |

(52) U.S. Cl.
CPC ............ *H04W 36/30* (2013.01); *H04W 84/045* (2013.01)

(58) Field of Classification Search
CPC ......................... H04W 48/06; G06F 17/30345
USPC .................. 455/444, 410, 434, 449, 422.1
See application file for complete search history.

(56) References Cited

U.S. PATENT DOCUMENTS

| | | | | |
|---|---|---|---|---|
| 2010/0178916 | A1* | 7/2010 | Jamadagni | ................. 455/434 |
| 2012/0122422 | A1* | 5/2012 | Olsson et al. | ................. 455/410 |

OTHER PUBLICATIONS

3GPP TS 36.304 v10.6.0 (Jun. 2012) Technical Specification; User Equipment (UE) procedures in idle mode, 3GPP, Valbonne, France, 2012, 33 pages.
3GPP TS 36.331 v10.11.0 (Sep. 2013 Technical Specification; Evolved Universal Terrestrial Radio Access (E-UTRA) Radio Resource Control (RRC), 3GPP, Valbonne, France, 2013, 308 pages. Section 5.2.4.3 Mobility States of a UE, 3GPP TS 36.304 v10.6.0 (Jun. 2012) Technical Specification; User Equipment (UE) procedures in idle mode, 3GPP, Valbonne, France, 2012, 1 page.

(Continued)

*Primary Examiner* — Phuoc H Doan
(74) *Attorney, Agent, or Firm* — Brinks Gilson & Lione (57) ABSTRACT

User equipment (UE) includes an architecture for handling femtocell fingerprints. The architecture may, as examples, maintain the validity and reliability of fingerprints and coordinate enhancement to existing fingerprints. The architecture also supports fingerprint creation, updating, and deletion.

24 Claims, 7 Drawing Sheets

(56) References Cited

OTHER PUBLICATIONS

Section 5.5.6.2, Speed dependant scaling of measurement related parameters, 3GPP TS 36.331 v10.11.0 (Sep. 2013 Technical Specification; Evolved Universal Terrestrial Radio Access (E-UTRA) Radio Resource Control (RRC), 3GPP, Valbonne, France, 2013, 2 pages.

Kwak, H., et al., Mobility Management Survey for Home-eNB Based 3GPP LTE Systems, Journal of Information Processing Systems, vol. 4, No. 4, Dec. 2008, 8 pages.

UMTS frequency bands downloaded from Wikipedia (http://en.wikipedia.org/wiki/UMTS_frequency_bands), Nov. 9, 2013, 6 pages.

* cited by examiner

FEMTOCELL FINGERPRINTING

PRIORITY CLAIM

This application claims priority to: U.S. Provisional Application Ser. No. 61/900,473, filed 6 Nov. 2013, U.S. Provisional Application Ser. No. 61/847,237, filed 17 Jul. 2013, U.S. Provisional Application Ser. No. 61/859,874, filed 30 Jul. 2013, and U.S. Provisional Application Ser. No. 61/867,298, filed 19 Aug. 2013, all of which are entirely incorporated by reference.

TECHNICAL FIELD

This disclosure relates to femtocells and facilitating wireless communication device connection to femtocells.

BACKGROUND

Rapid advances in communication technologies, driven by immense customer demand, have resulted in the widespread adoption of mobile communication devices. Many of these devices, e.g., smartphones, have sophisticated wireless connectivity options. In addition to fundamental voice call connectivity with base stations serving very large numbers of subscribers is another connection option: connecting to femtocells within, e.g. The femtocells typically support fewer subscribers, but may provide call quality, cost, bandwidth, or other advantages to those subscribers.

DETAILED DESCRIPTION

Figure 1:
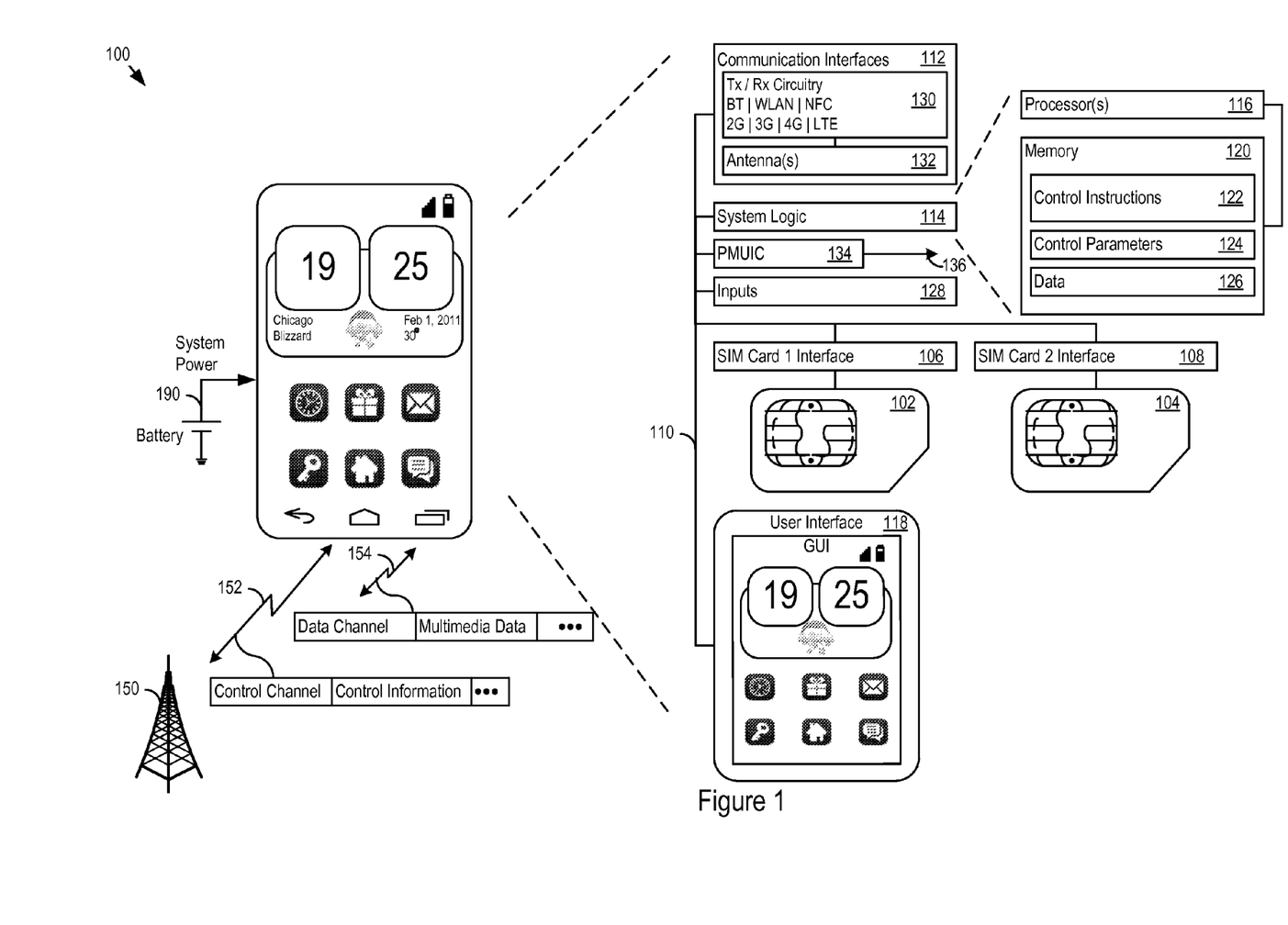
FIG. 1 shows an example of user equipment.

FIG. 1 shows an example of user equipment 100 ("UE 100"). The UE 100 is a smartphone in this example, but the UE may be any electronic device. The techniques described below regarding femtocells may be implemented in a wide array of different types of devices. Accordingly, the smartphone example described below provides just one example context for explaining the femtocell connection and communication techniques.

As one example, UE may be a 2G, 3G, or 4G/LTE cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The UE may also be a smartphone that, in addition to making and receiving phone calls, runs any number or type of applications. UE may, however, be virtually any device that transmits and receives information, including as additional examples a driver assistance module in a vehicle, an emergency transponder, a pager, a satellite television receiver, a networked stereo receiver, a computer system, music player, or virtually any other device.

FIG. 1 shows an example of the UE 100 in communication with a network controller 150, such as an enhanced Node B (eNB) or other base station. The network controller 150 and UE 100 establish communication channels such as the control channel 152 and the data channel 154, and exchange data. In this example, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The UE 100 includes communication interfaces 112, system logic 114, and a user interface 118. The system logic 114 may include any combination of hardware, software, firmware, or other logic. The system logic 114 may be implemented, for example, with one or more systems on a chip (SoC), application specific integrated circuits (ASIC), discrete analog and digital circuits, and other circuitry. The system logic 114 is part of the implementation of any desired functionality in the UE 100. In that regard, the system logic 114 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 and the inputs 128 may include a graphical user interface, touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 114 may include one or more processors 116 and memories 120. The memory 120 stores, for example, control instructions 122 that the processor 116 executes to carry out desired functionality for the UE 100. The control parameters 124 provide and specify configuration and operating options for the control instructions 122. The memory 120 may also store any BT, WiFi, 3G, or other data 126 that the UE 100 will send, or has received, through the communication interfaces 112. The UE 100 may include a power management unit integrated circuit (PMUIC) 134. In a complex device like a smartphone, the PMUIC 134 may be responsible for generating as many as thirty (30) different power supply rails 136 for the circuitry in the UE 100.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may include transceivers that support transmission and reception under the 2G, 3G (e.g., Universal Mobile Telecommunications System (UMTS) or High Speed Packet Access (HSPA)+ operation), BT, WiFi, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

As just one implementation example, the communication interface 112 and system logic 114 may include a BCM2091 EDGE/HSPA Multi-Mode, Multi-Band Cellular Transceiver and a BCM59056 advanced power management unit (PMU), controlled by a BCM28150 HSPA+ system-on-a-chip (SoC) baseband smartphone processer or a BCM25331 Athena™ baseband processor. These devices or other similar system solutions may be extended as described below to provide the additional functionality described below. These integrated circuits, as well as other hardware and software implementation options for the UE 100, are available from Broadcom Corporation of Irvine Calif.

Figure 2:
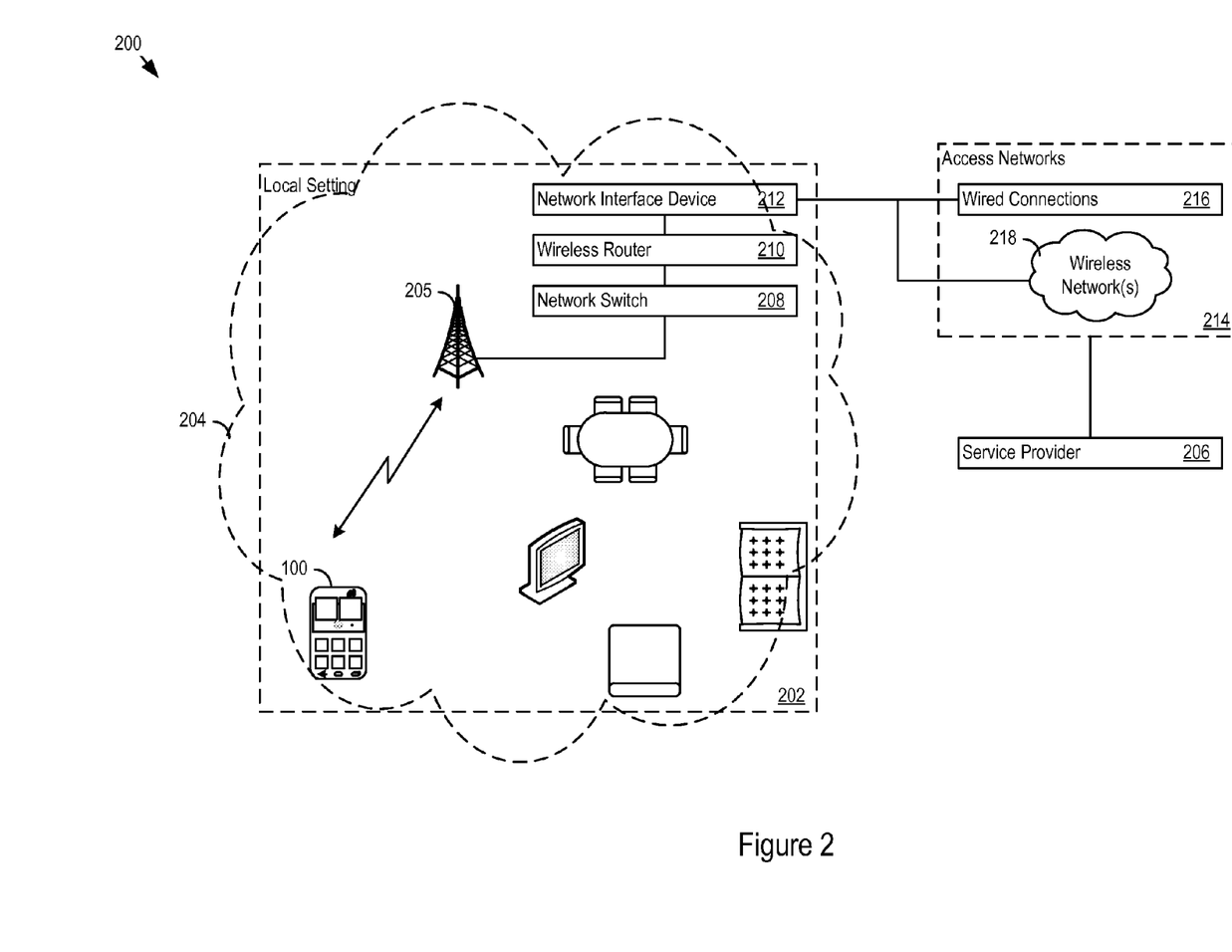
FIG. 2 shows an example architecture for a local setting with a femtocell.

FIG. 2 shows an example architecture 200 for a local setting 202 covered by a femtocell 204. A femtocell basestation 205 (e.g., a low transmit power eNB) generates the femtocell 204. The local setting 202 may be a home or office, as examples, in which one or more femtocells 204 provide cellular coverage within the local setting 202. The femtocell basestation 205 may perform the functions of a cellular basestation, for example, according to the 3GPP standard.

As just one example, the femtocell 204 may have footprint range from about 10s to 100s of meters, e.g., between 10 and 200 m. In a residential environment, the femtocell 204 may support, e.g., 2 to 4 active calls. The femtocell 204 increases the coverage area provided by macrocells generated by full scale outdoor base stations, and may improve data throughput and voice quality. The femtocell 204 may further reduce uplink transmission power requirements from the UE 100, because the femtocell basestation 205 is much closer, and may therefore improve the battery life of the UE 100.

In order to distinguish between a macrocell and a femtocell, the cell information broadcast by the femtocell may include a femtocell identity (given, e.g., by the csg-Identity field in the System Information Block 1 (SIB1)) and optionally a femtocell indication flag set to TRUE (given, e.g., in the csg-Indication field in SIB1). In some cases, the femtocells may have a valid femtocell identity and a femtocell indication flag set to FALSE. Such cells are referred to as hybrid cells. A hybrid cell would act as a femtocell for the users authorized for connection to that femtocell and as a normal non-femtocell cell to other UEs.

Most of the broadcast (beacon) information sent by a femtocell is similar to that sent by a macrocell, except for the femtocell identity and femtocell indication flag mentioned above. In addition, with the introduction of femtocells, both femtocells and macrocells can optionally broadcast a list identifying known femtocell neighbor cells to help the UE 100 do cell reselection to such femtocells if the cellular radio environment warrants the reselection and if the UE 100 has a subscription to the neighboring femtocell.

The femtocell basestation 205 may connect to the service provider 206 in many different ways. In the example shown in FIG. 2, the femtocell basestation 205 connects to a port on a network switch 208. The network switch 208 connects to a wireless router 210 that also provides WiFi connectivity in the local setting 202. A network interface device 212 provides a connection to the backbone (e.g., internet service) for the local setting 202. The network interface device 212 may be a cable modem, DSL modem, T1 or T3 line, satellite transceiver, optical network interface, or other network interface device. The network interface device 212 and, therefore, the femtocell 204, connect through the access network(s) 214 to the service provider 206. The access networks may include wired connections 216, e.g., T4 or T5 lines, and wireless connections 218, e.g., microwave or satellite links.

The configuration of the femtocell 204 may include a specification of UEs that are allowed to connect to the femtocell 204 and receive service. The specification of UEs may be done in many different ways, such as by creating a whitelist of allowable phone numbers, International Mobile Station Equipment Identity (IMEI) numbers, or other identifiers. The set of UEs that have access to the femtocell 204 may therefore be closely controlled by the owner or operator of the femtocell 204. For example, in a home setting, the homeowner may configure the femtocell 204 to allow connections to the group of UEs carried by family members, friends, guests, or any other individuals. The group of UEs that have access to the femtocell 204 may be referred to as a Closed Subscriber Group (CSG). The CSG cells referred to in the 3GPP standard may be considered a subset of femtocells. In particular, CSG cells are cells that broadcast a CSG indication set to True and a specific CSG identity. However, the techniques disclosed in this document apply to femtocells of other types, whether defined under a particular standard or otherwise implementing selective or controlled access to a group of UEs, e.g., in a more restrictive manner than a macrocell.

Figure 3:
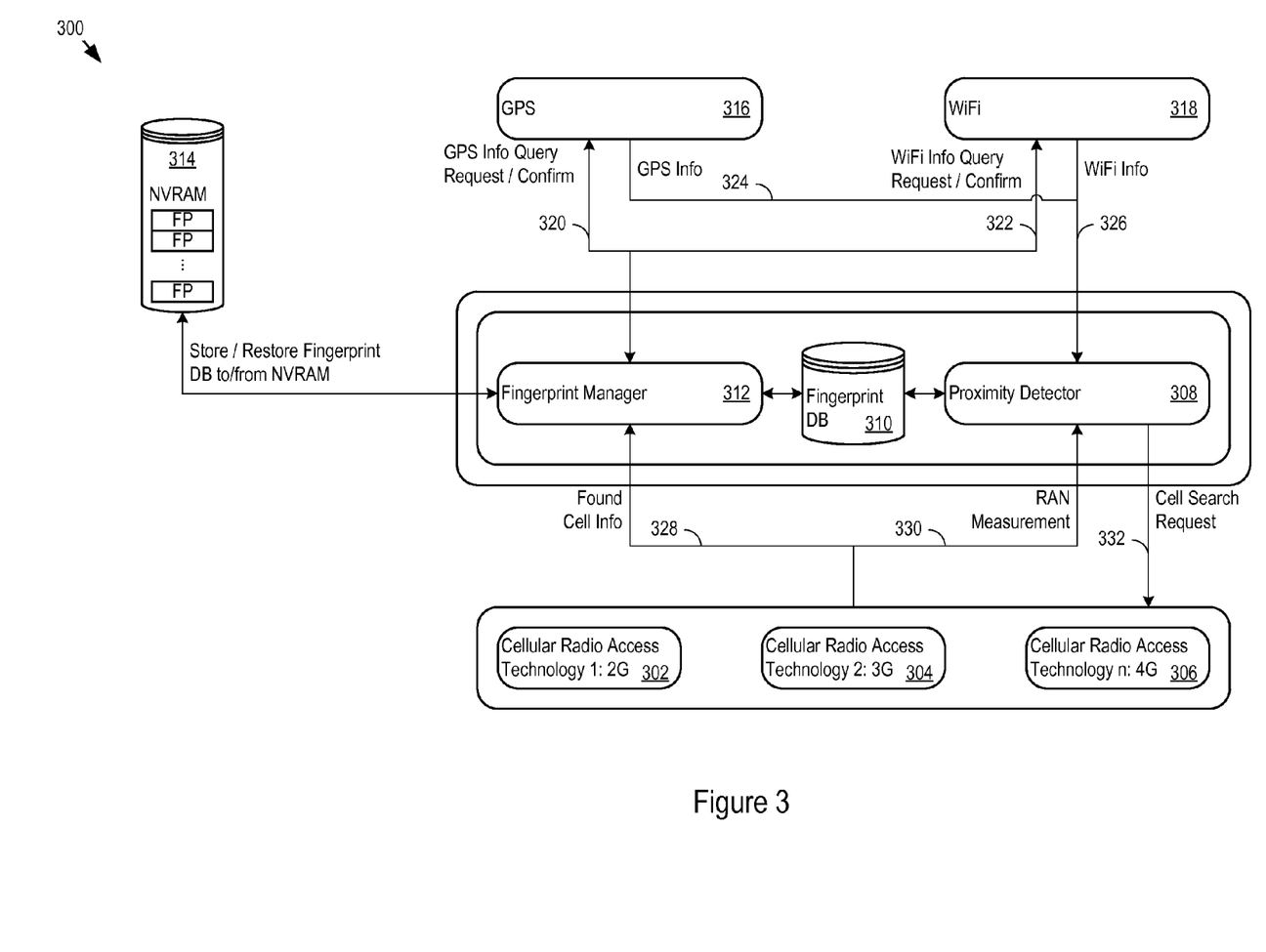
FIG. 3 shows an example fingerprinting architecture.

FIG. 3 shows an example fingerprinting architecture 300. The architecture 300 is one example of the type of system architecture that the UE 100 may implement for creating, updating, removing and otherwise managing fingerprints. There are many other ways to implement such an architecture, and the UE 100 is not limited to the architecture 300.

Note that the operator of the UE 100 may select which cell to prioritize for future selection by the UE 100. The cell may be a femtocell. In that case, the UE 100 may record characterizing information for the femtocell from any available sources. The UE 100 employs the characterizing information to subsequently determine whether the UE 100 is proximate to the femtocell, and if so, trigger an Autonomous Search Function (ASF) in an attempt to find and connect to the femtocell. The collection of characterizing information for the femtocell may be referred to as a fingerprint for that femtocell.

The fingerprint may contain multiple components, e.g., measurement inputs, that capture the characterizing information. The fingerprint components may include, as a few examples:

Global Positioning System (GPS) position;

Wireless network characteristics concerning any type of wireless network, such as 802.11 a/b/g/n/ac/ad networks, or wireless networks employing WiMAX base stations or access points (APs). The characteristics may be determined by sensing and measuring, e.g., visible APs. As examples, the characteristics may include WiFi signal strengths in the measurable environment, WiFi Service Set Identifiers (SSIDs) for available APs, security types employed by APs (e.g., WiFi Protected Access (WPA) or WPA2), or other characteristics of wireless networks;

timing measurements to neighbor cells;

Radio Access Technologies (RATs) used by nearby macrocells or femtocells, e.g., whether Global System for Mobile Communications (GSM), Universal Mobile Telecommunications System (UMTS), or Long Term Evolution (LTE);

BT and NFC signal strength, identifiers, or other BT or NFC environmental characteristics, and BT or NFC events, such as BT or NFC pairing and communication events (e.g., the fingerprint may include information identifying the most recent BT or NFC event for the femtocell that is being fingerprinted);

Public Land Mobile Network Identifier (PLMN ID);

Global Cell Identity, such as an Evolved Universal Mobile Telecommunications System Terrestrial Radio Access Network (E-UTRAN) Cell Global Identifier (ECGI): the 28-bit cell identity value in combination with a PLMN-identity. The Global cell identity may be useful, e.g., when physical cell identities are reused;

cell power level and signal quality measurements;

identifying information for nearby macrocells or femtocells from which the UE 100 can receive signals;

Downlink frequency to the UE 100, as examples, an Absolute Radio Frequency Channel Number (ARFCN), a Universal Mobile Telecommunications System (UMTS) Terrestrial Radio Access (UTRA) ARFCN (UARFCN), or Evolved Universal Terrestrial Radio Access (EUTRA) ARFCN (EARFCN);

other cell information, such as the Physical Cell Identity (PCI) obtained during cell synchronization, Primary Scrambling Code (PSC), and Base Station Identity Code (BSIC); Note that the cell information may be a scrambling code, e.g., a 3GPP scrambling code or an LTE PCI, but that other implementations may use other types of cell information that may, by itself or in combination with other information, distinguish cells or indicate a cell type (e.g., a femtocell type or a macrocell type);

Reference Signal Received Power (RSRP) information, e.g., the average power of Resource Elements (REs) carrying Reference Signals (RSs) over a specified bandwidth;

Received Signal Strength Indicator (RSSI) information, e.g., the received wide-band power, potentially across all received symbols and including interference and noise; and Time Delay of Arrival (TDoA) to other cells.

The UE 100 analyzes the fingerprint against measurements to determine whether the UE 100 is near a femtocell. The UE 100 may, for example, compare measurements of the environment (e.g., the currently visible SSIDs and macrocells) against the fingerprint to find a match to all or part of the fingerprint. The UE 100 may determine whether a match exists based on predetermined decision criteria that specify which parts, how much, and/or to what degree, the fingerprint components should agree with the measurements to be considered a match.

In support of fingerprinting, the architecture 300 interacts with one or more cellular RATs. In the example in FIG. 3, the RATs include a 2G RAT 302, a 3G RAT 304, and a 4G/LTE RAT 306. There may be any number or type of such RATs. The architecture 300 also includes a proximity detector 308. The proximity detector 308 may perform the analysis described above to determine whether current measurements match a fingerprint stored in the fingerprint database 310. Note that any of the RATs may return information to the fingerprint manager 312 and proximity detector 308. For example, the RATs may return cell information 328 about the macrocells and femtocells found in the vicinity, and Radio Access Network (RAN) measurements 330 that characterize the environment around the UE 100. The fingerprint manager 312 and proximity detector 308 may issue requests to the RATs as well. For example, the proximity detector 308 may initiate a cell search request 332. The cell search request 332 may be in response to finding a matching fingerprint.

The architecture 300 also includes a fingerprint manager 312. The fingerprint manager 312 may handle the storage, recovery, addition, modification, deletion, or other management tasks on the fingerprints in the fingerprint database 310.

Note that the architecture 300 may include additional storage 314 for the fingerprints, such as Non-volatile Random Access Memory (NVRAM). As a result, the saved fingerprints may be retrieved and used when the UE 100 completes its power-on procedures after a power-down. The fingerprints are labeled with the abbreviation 'FP' in FIG. 3.

As explained above, the fingerprints may include components of many different types. To that end, the architecture 300 may also interact with the GPS logic 316, the WiFi logic 318, or other logic. The fingerprint manager 312 may issue GPS information queries 320 or WiFi information queries 322 to the GPS logic 316 and WiFi logic 318. The GPS logic 316 and WiFi logic 318 return GPS information 324 (e.g., location coordinates or timing information) and WiFi information (e.g., SSIDs) to the proximity detector 308.

As previously explained, the proximity detector 308 may detect proximity to a previously fingerprinted cell based on one or more inputs including, as examples, RAT, WiFi, and GPS inputs. The proximity detector 308 may receive measurements periodically or on an event based basis. The proximity detector 308 may also issue measurement queries from different available component sources, such as RAT1-RATn, WiFi, and GPS. The proximity detector 308 attempts to match the measurement results against fingerprints in the fingerprint database 310 that the architecture 300 recorded for previously visited cells.

The proximity detector 308 may use the measurement inputs in a phased way. For example, the proximity detector 308 may determine a coarse match or lock based on RAN measurements. The proximity detector 308 may then obtain further measurement inputs, such as by determining whether GPS is enabled, and if so, checking proximity to a particular location specified in the fingerprint. As another example, the proximity detector 308 may determine proximity to the cell by matching a WiFi SSID, or taking additional RAN macrocell information, and may further take steps to confirm that the WiFi router has not moved or changed.

The proximity detector 308 may indicate a detection confidence level which may be used to perform a search for the cell in a power optimized way. That is, the confidence level may affect whether a search is done at all, and if so, how often and when the search is executed.

The proximity detector 308 may take into account other factors to determine whether the UE 100 will start searching for a fingerprinted cell. Examples of the other factors include cell size and velocity of travel. For instance, the proximity detector 308 may not indicate a proximity detection when a fingerprinted cell is less than a threshold size, and the UE 100 is determined to be travelling at a high speed that exceeds a speed threshold.

When the UE 100 is in Idle mode, the proximity detector 308 may trigger the currently active RAT to begin searching for (e.g., measuring) the target cell when proximity is detected. In connected mode the UE 100 may indicate proximity through signaling with the network controller 150, e.g., in the control channel 152. In connected mode, the network controller 150 may then instruct the UE 100 to attempt to connect to the target cell (the cell for which a fingerprint match was found).

The fingerprint manager 312 may add, remove, and update fingerprints based on various inputs. The inputs may include, as examples: failure to find a fingerprinted cell after search is triggered, successful reselection to fingerprinted cell, and the time to find fingerprinted cell after search is triggered.

The fingerprint manager 312 may update fingerprints wholly or partially. For instance, the fingerprint manager 312 may update, delete, or add measurements for some macrocells without affecting other components in the fingerprint. The fingerprint manager 312 may generate a fingerprint when the UE 100 enters a femtocell. In that regard, the fingerprint manager 312 may execute, for example, a full network scan to determine visible macrocells in all RATs, and, if available, WiFi, and GPS measurements. As another example, the fingerprint manager 312 may generate the fingerprint from neighbor cell measurements that the UE 100 performs as part of its normal housekeeping operations for maintaining cell connectivity, prior to reselecting to the fingerprinted cell.

The architecture 300 may use the native RAT for the matched fingerprinted cell to perform the search for the matched cell. That is, the RAT (or any other search logic) may attempt to find the matched cell when the proximity detector 308 instructs it to do so. In that regard, the RAT may scan the frequencies associated with the matched cell in an attempt to find transmissions from the matched cell.

The RAT may take into account the proximity detection confidence level indicated by the proximity detector 308 when determining whether, when, and how often to search. For instance, a lower confidence may result in a less frequent search, helping to preserve battery life.

To confirm that the detected transmissions originate from a cell that is in fact the cell that the UE 100 is searching for, the search logic may acquire system information from the target cell. The UE 100 may do so while still camped on an existing serving cell. For instance, the UE 100 may perform background System Information Block (SIB) acquisition. The SIBs provide identity information for the transmitting cell. The UE 100 may ensure that the cell identity matches that of the fingerprinted cell. This may help to avoid frequent failed reselection attempts. The UE 100 may also use this preemptive SIB acquisition to determine that the target cell meets any specified suitability criteria before the cell reselection attempt is performed, by checking SIB data against the criteria.

Alternatively, the UE 100 may choose to not perform background SIB acquisition. Instead, the UE 100 may trigger cell reselection directly without prior confirmation that the measured cell is the correct preferred cell. In this case the UE 100 may store cell selection parameters (e.g., from the system information) as part of the fingerprint when initially fingerprinting the cell. The UE 100 may use these parameters to perform pre-suitability-checking of the target cell before deciding whether a cell reselection will be performed. If the UE 100 decides to reselect and subsequently discovers that the cell is actually not the correct cell, e.g., based on checking the cell identity, Public Land Mobile Network (PLMN) identity, or other information, the UE 100 may bar this cell from future connection attempts. The bar may last, e.g., for as long as the cell remains visible or for a predetermined time.

Cell Search and Fingerprint Management

Note that the Autonomous Search Function (ASF) noted above may search for previously camped femtocells. The ASF may trigger responsive to fingerprints built with any type of fingerprint components, such as those components given above in the example list of fingerprint components. In one particular implementation, the proximity detector 308 may trigger the ASF responsive to matches of the current environment against the fingerprint component tuple {downlink frequency, physical cell identity, and RAT type}. As noted above, the cell identities may be PCIs for LTE cells, scrambling codes for 3G cells, or other types of cell information.

These fingerprint components may be selected because they are available from the PHY layer as part of the usual cell selection and reselection process. That is, the UE 100 needs to spend no additional energy to obtain these fingerprint components, making this set of components energy efficient in terms of deciding when to start ASF. However, any other combination of one or more fingerprint components may be included in the matching process. Further, in other implementations the PHY layer may provide additional measurements taken for cell selection and reselection that may also be included in the fingerprint component tuple, such as RSSI or RSRP.

Note that the PHY layer may detect multiple physical cell identities (e.g., LTE PCIs, 3G scrambling codes, or other types of identity information) in the environment on a particular downlink frequency and RAT type. That is, the environment may include multiple visible cells found on multiple different RATs and downlink frequencies. Accordingly, it may be that the fingerprint (as just one example) specifies multiple (e.g., three) different physical cell identities for a single downlink frequency and RAT type.

Furthermore, in some implementations, the proximity detector 308 may determine a match when all or only some current environment measurements match the selected fingerprint components. The proximity detector 308 may also determine a match when a threshold percentage of measurements match, e.g., 8 physical cell identity measurements match out of 10 physical cell identity fingerprint components. The threshold percentage may be statically set or dynamically modified. For instance, the UE 100 may modify the threshold percentage in response to or as a function of battery level. When the battery level is high, the threshold may be lower, causing the UE 100 to frequently find matches and initiate ASF. However, when the battery level is lower, the UE may set the threshold percentage higher, causing the UE 100 to less frequently find matches and initiate ASF and thereby conserving remaining energy.

Searches for femtocells may occur periodically, or through triggering ASF because of fingerprint matches, as examples. Periodic searches may be searches that happen at a predetermined interval, not in response to fingerprint matches. In either case, the frequency of search may vary depending on battery level. Further, whether any search happens at all may depend on whether the battery level exceeds a search threshold.

Figure 7:
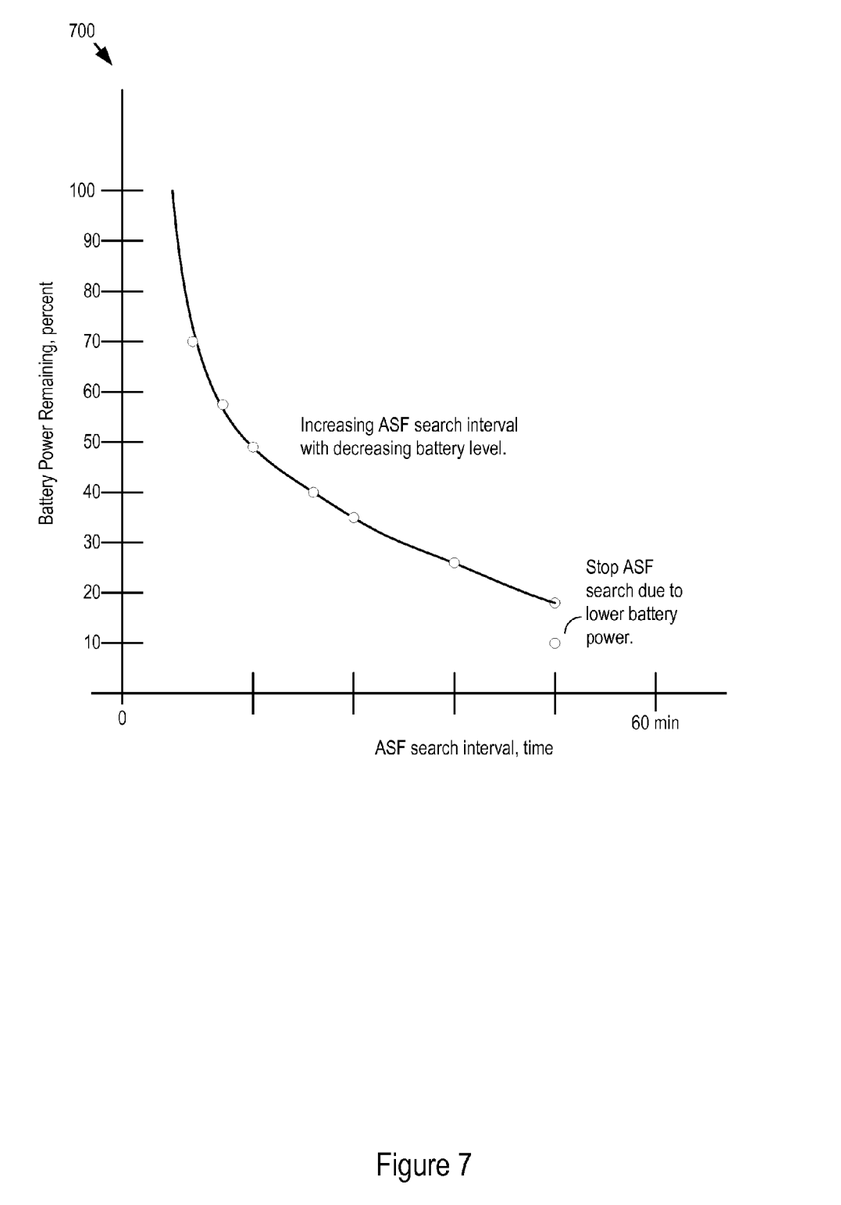
FIG. 7 shows an example relationship between remaining battery power and ASF search interval.

The frequency of either type of search may be a function proportional to the power remaining in the UE 100. Turning ahead to FIG. 7, that Figure shows an example relationship 700 between remaining battery power and search interval (e.g., for periodic search). As shown in the relationship 700, decreasing battery power may lead to increasing search interval (and decreasing search frequency), and vice versa. Further, searches may stop altogether once battery power falls below a given threshold. Hence, battery power is conserved due to the decreased frequency of the femtocell searches.

Further, the UE 100 may avoid (e.g., periodic) femtocell searches altogether if the UE 100 is already camped on a macrocell, to conserve battery power. When the battery level is below a threshold, camping onto a femtocell may not be a high priority activity and hence the UE 100 may avoid a battery-intensive scan during a (e.g., periodic) femtocell search.

In connected mode, the UE 100 may choose whether or not to send a proximity indication to the network depending on whether the remaining battery power in the UE 100 is less than a specific threshold. Withholding the proximity indication may prevent the network from requesting measurements on the femtocell frequencies. This may further help conserve battery power. That is, if the UE 100 is in connected mode, and there is a fingerprint match for a femtocell, the UE 100 may send the proximity indication only if the battery power remaining is above a proximity indication threshold.

Because the environment around the femtocell may change, as may the femtocell itself, the architecture 300 may create, update, and store fingerprints to help achieve the reliable proximity detection, avoid unnecessary cell searching and wasting of battery power, and improve operator experience with the UE 100. The architecture 300 helps address validity and reliability issues with fingerprints. For instance, a fingerprint may rely on the stability of wireless cellular system and/or the environment in which the measurements are taken. For example, a change in the macrocell configuration can hamper proximity detection that includes measurements prior to the change. Further, if a femtocell is turned off or moved to another location or stops working, then the UE 100 may still, based on the fingerprints, trigger an ASF search. The ASF search will fail every time because the femtocell is no longer available, and this may cause significant power drain in the UE 100.

The architecture 300 also enhances fingerprint management and creation to help address validity and reliability of fingerprints. For example, the proximity detector 308 detects proximity to a femtocell when the UE 100 approaches the femtocell where the fingerprint was taken. In some situations, the fingerprint may be taken in a location to which the UE 100 does not commonly return (e.g., a basement room in a house), and where the environmental measurements, e.g., of nearby macrocells, are not same as other places where the UE 100 is more commonly located. Similarly, if the UE 100 takes a different path to approach the femtocell that has little environmental characteristics overlap with the existing fingerprint, the ASF may not be triggered and the femtocell will not be discovered without manual intervention.

Figure 4:
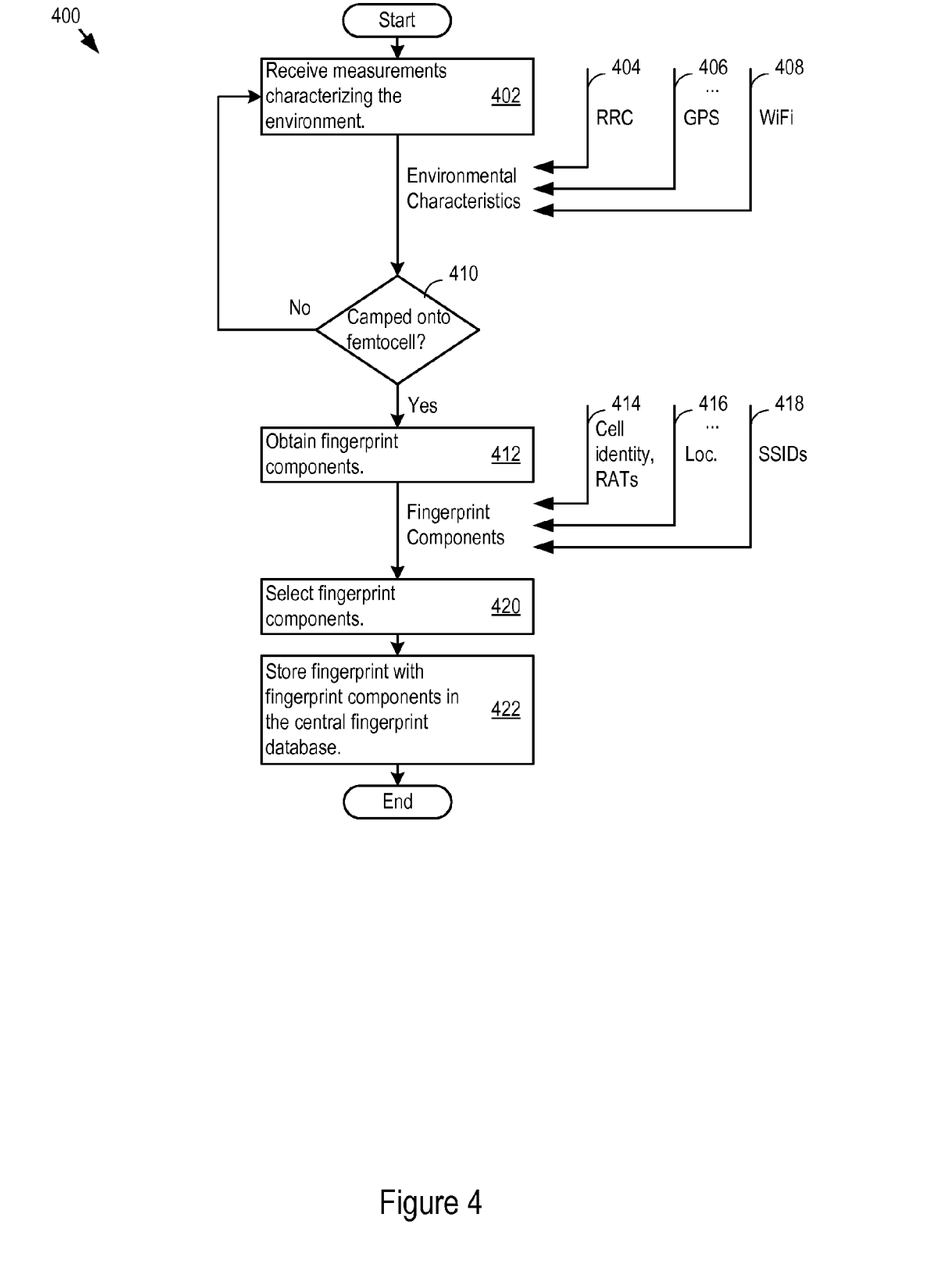
FIG. 4 shows example logic for creating a new fingerprint.

FIG. 4 shows example logic 400 that the architecture 300 may implement for creating a new fingerprint. The fingerprint manager 312 may create and insert fingerprints into the central fingerprint database 310 in response to, as examples, manual, periodic, or automated femtocell searches and selections.

The logic 400 includes receiving measurements that characterize the environment (402). The measurements may be received as radio resource control messages, for example, that specify nearby macrocell identities, RSSI/RSRP, TDoA, or other measurements obtained from cellular transceivers (404). The measurements may include location information, such as that received from a GPS receiver (406). Additionally, the measurements may include WiFi information, such as visible SSIDs (408). The logic 400 may obtain the measurements by, for example, calling Application Programming Interfaces (APIs) that provide an interface to the GPS logic 316, WiFi logic 318, or any other logic that can sense the environment.

The logic 400 determines whether the UE 100 has camped successfully onto a femtocell (410). If so, the logic 400 may create a fingerprint of the environment, by obtaining fingerprint components for the fingerprint (412). As examples, the fingerprint components may include macrocell identities and RAT types for the macrocells (414), location information (e.g., latitude and longitude) (416), and SSIDs (418). The logic 400 need not use every available fingerprint component in a fingerprint, but may select the fingerprint components according to any selection criteria, e.g., reliability, signal strength, or other criteria (420). The logic 400 creates a fingerprint in the central fingerprint database 310 that includes the selected fingerprint components (422).

Figure 5:
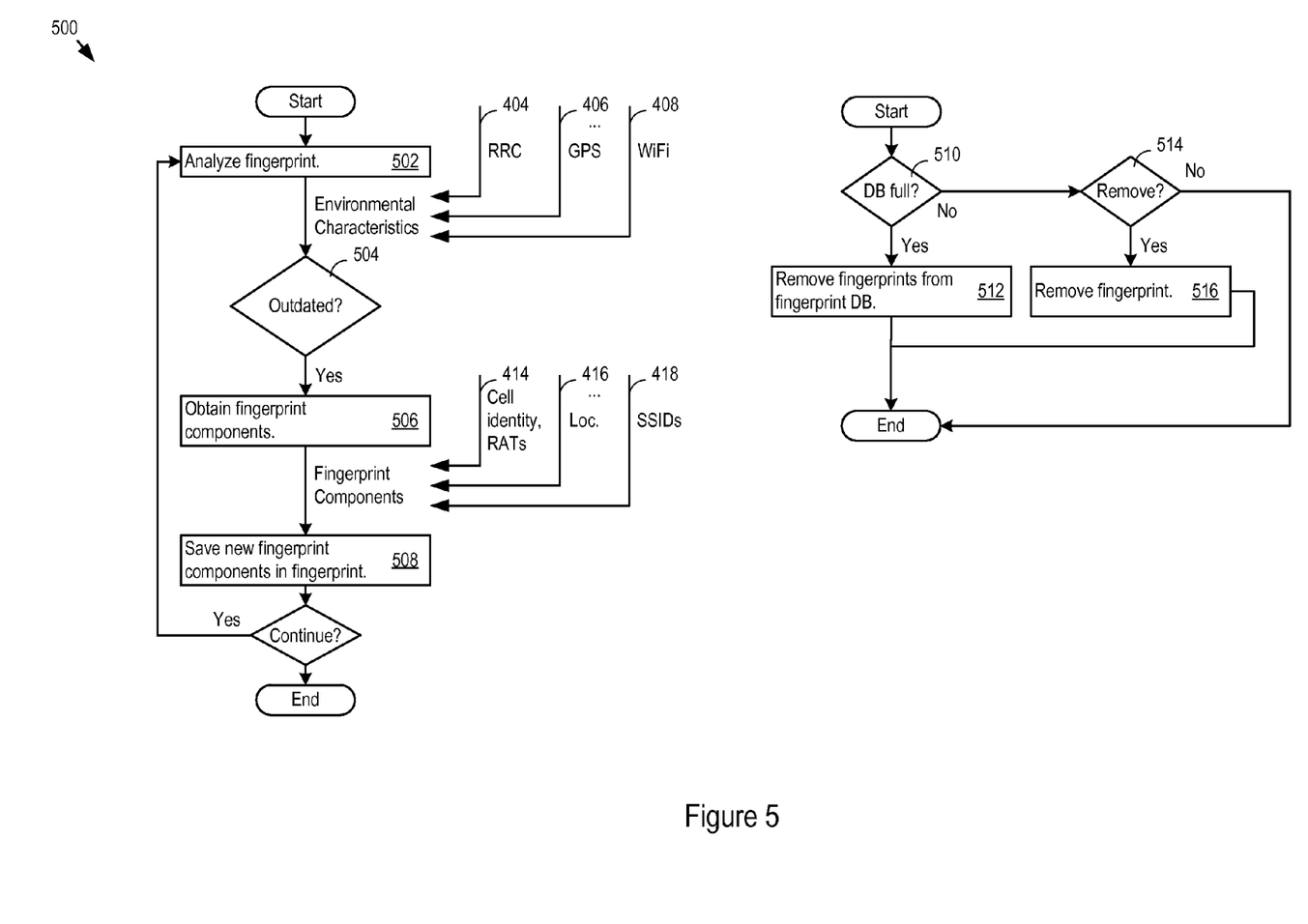
FIG. 5 shows example logic for updating a fingerprint.

Note that in some implementations, the UE 100 may restrict the fingerprints that trigger ASF to those fingerprints associated with femtocells that belong to a selected PLMN, e.g., a particular home PLMN or registered PLMN. In other implementations, the UE 100 may trigger ASF in response to finding a matching fingerprint of a femtocell that belongs to any PLMN, and not just to a particular home PLMN or registered PLMN. However, in other implementations, the UE 100 may rely on manual femtocell selection to connect to femtocells that do not belong to a home, registered, or equivalent PLMN. FIG. 5 shows example logic 500 that the architecture 300 may implement for updating a fingerprint. The fingerprint manager 312 may analyze the fingerprints (502) and determine when a fingerprint is outdated (504). In one implementation, the fingerprint manager 312 may determine that the fingerprint is outdated if the PCI or PSC have changed for the femtocell or a neighboring cell. Alternatively or additionally, the fingerprint manager 312 may determine that a fingerprint is outdated when the frequency configuration of the femtocell or a neighboring cell has changed (e.g., the femtocell has moved to a new Tx or Rx frequency).

If a fingerprint is outdated, the fingerprint manager 312 may obtain updated fingerprint components (506) and save them in the fingerprint (508). For instance, the UE 100 may maintain multiple fingerprints for the same femtocell. The multiple fingerprints may correspond to different physical approaches to the femtocell. The fingerprint manager 312 may refine any one or more of these fingerprints when it determines that one or more environmental measurements are more reliable, more recent, or more accurate than the existing fingerprint components. Refining fingerprints may result in tighter bounds on the proximity detection algorithm thereby reducing the ASF area and improving UE battery life.

The fingerprint manager 312 may also update fingerprints in other ways. For instances, if the fingerprint database 310 is full (510), the fingerprint manager 312 may remove one or more fingerprints from the fingerprint database (512). In one implementation, the fingerprint manager 312 removes fingerprints starting with the most infrequently-used fingerprint, which may be determined according to a last used time stamp on the fingerprint. The fingerprint manager 312 may remove any number of fingerprints, and as one example, may remove a number of fingerprints equal to the number of new fingerprints that the fingerprint manager desires to add to the fingerprint database 310.

Note that when a fingerprint has triggered a number of failed ASF attempts that exceed a backoff threshold parameter, within a configured amount of time, then the proximity detector 308 may increase the interval between searches, e.g., exponentially. For instance, if the fingerprint has triggered more than three failed ASF attempts within two minutes, then the proximity detector 308 may increase the time interval until the next search is performed in an, e.g., exponentially increasing manner. This may help conserve battery power. In some instances, the number of (optimally consecutive) failed ASF searches will reach a predetermined removal threshold (514). This may indicate that the femtocell has been removed or is powered down, or that the environment around the femtocell has changed significantly. When the removal threshold is met, the fingerprint manager 312 may remove the fingerprint (516).

The fingerprint manager 312 may save the fingerprint database 310 into the storage 314 whenever desired, such as when the fingerprint database 310 is changed. As another example, the fingerprint manager 312 may save the fingerprint database 310 to the storage 314 as part of the power-off procedure for the UE 100, and may restore the fingerprint database 310 from the storage 314 as part of the power-on procedure for the UE 100, or when ASF is enabled.

Note that some operators of the UE 100 may camp on several specific femtocells quite often. Accordingly, the UE 100 may prioritize selecting and searching for more frequently used femtocells or more recently used femtocells. In that respect, the fingerprint manager 312 may store a greater number of fingerprints for femtocells which it has connected to more than a threshold number of times in a configured time period (e.g., more than 2 times in one day, or 10 times in one week), or for femtocells that have been connected to in less than a specified time duration (e.g., in the last day).

Figure 6:
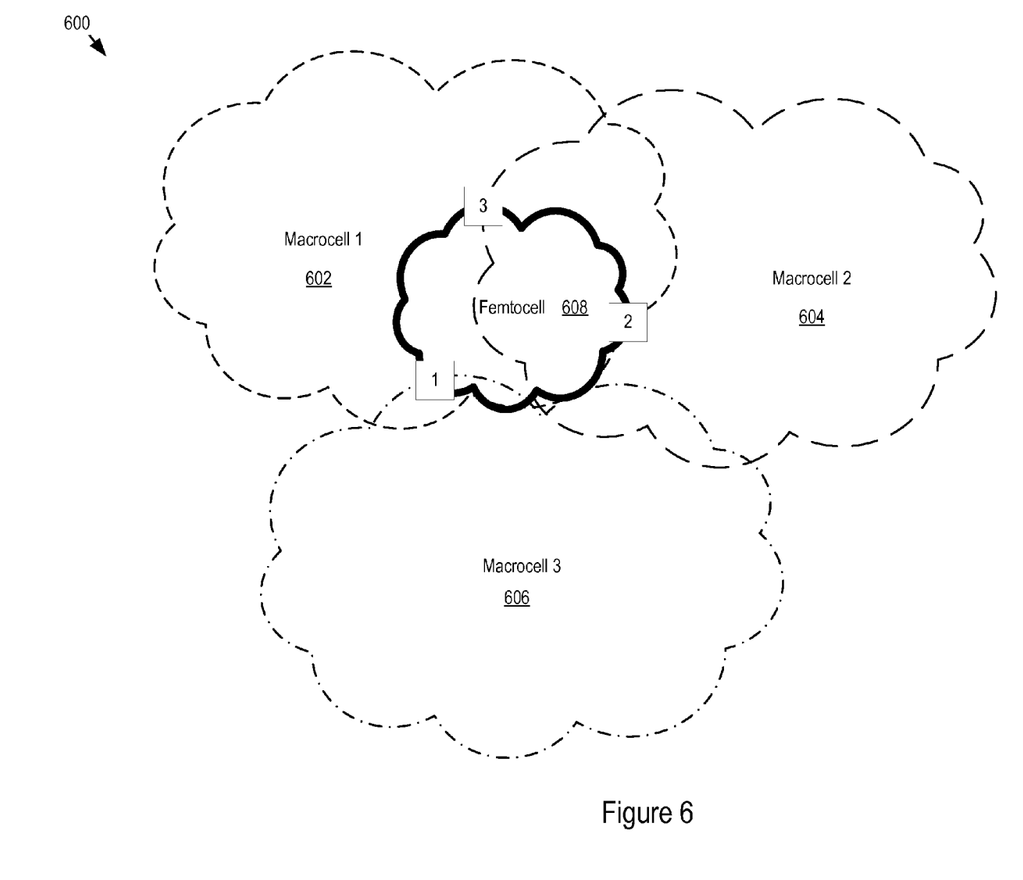
FIG. 6 shows an example environment for which the UE captures additional fingerprints.

FIG. 6 shows an example environment 600 for which the UE 100 captures additional fingerprints. In the environment 600, there are three macrocells 602, 604, and 606. The femtocell 608 is also shown.

When the UE 100 is camped on the femtocell 608, the fingerprint manager 312 may create additional fingerprints for that same femtocell 608. For instance, the fingerprint manager 312 or proximity detector 308 may recognize that the environment includes the same three macrocells 602, 604, and 606 at different positions 1, 2, and 3 in the environment around the femtocell 608, and that the measurement results are different. In that situation, the fingerprint manager 312 may determine to generate and store additional fingerprints for the same femtocell 608.

In some instances, the femtocell 608 may create its own neighbor macrocell list by scanning the environment for macrocell frequencies. Once the UE 100 camps onto the femtocell 608, the fingerprint manager 312 may obtain the neighbor macrocell list (e.g., by receiving System Information Blocks from the serving cell), and store any or all of the neighbor macrocell information as part of the fingerprint for the femtocell 608. The proximity detector 308 may use the macrocell information for proximity detection and fingerprint creation, even if the UE 100 does not have current on-the-air measurements for all of the frequencies from the list.

With regard to FIG. 6, the operator of the UE 100 may manually select to camp onto the femtocell 608. While the UE 100 moves in the coverage area of the femtocell 608, e.g., from location 1 to location 2 and to location 3, the fingerprint manager 312 may obtain additional environmental measurements at these locations, and may create fingerprints from those measurements. All of the fingerprints are associated with proximity to the femtocell 608 in the fingerprint database 310.

In time, the UE 100 will leave the coverage area of the femtocell 608. At that time, the fingerprint manager 312 may store the environmental measurements as yet another fingerprint for the femtocell 608. The fingerprint that captures the end of the coverage area may then function as one of the thresholds for initiating ASF.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

Various implementations have been specifically described. However, many other implementations are also possible.

What is claimed is:

1. A method comprising:
providing a central fingerprint database operable to store a fingerprint for proximity detection, the fingerprint characterizing proximity of a femtocell;
executing a fingerprint manager in communication with the fingerprint database for:
creating the fingerprint, and storing, for the fingerprint, a fingerprint component that characterizes proximity of the femtocell; and
executing a proximity detector in communication with the fingerprint database, and, with the proximity detector:
obtaining an environmental measurement;
analyzing the fingerprint to find that the fingerprint is a matching fingerprint with respect to the environmental measurement; and
initiating a cell search for a specific femtocell that corresponds to the matching fingerprint.

2. The method of claim 1, further comprising:
determining a particular femtocell for enhanced fingerprinting, and in response:
creating multiple fingerprints in the central fingerprint database for that particular femtocell.

3. The method of claim 2, where determining comprises:
determining the particular femtocell responsive to frequency of selection of that particular femtocell.

4. The method of claim 2, where determining comprises:
determining the particular femtocell responsive to recency of selection of that particular femtocell.

5. The method of claim 1, further comprising:
obtaining the fingerprint component from radio resource control measurements of neighboring macrocells.

6. The method of claim 1, further comprising:
obtaining the fingerprint component from positioning system measurements of location.

7. The method of claim 1, further comprising:
obtaining the fingerprint component from wireless network measurements of visible access points.

8. The method of claim 1, where creating the fingerprint comprises:
creating multiple different fingerprints corresponding to multiple different physical approaches to a particular femtocell among the femtocells.

9. The method of claim 1, further comprising:
determining when the fingerprint has triggered more than a threshold number of failed cell searches, and in response:
deleting the fingerprint from the central fingerprint database.

10. The method of claim 1, where creating the fingerprint comprises:
creating the fingerprint responsive to successful connections to the femtocells.

11. The method of claim 1, further comprising:
selectively updating the fingerprint component.

12. The method of claim 1, further comprising:
deleting the fingerprint.

13. A system comprising:
a central fingerprint database operable to store a fingerprint of a femtocell;
a fingerprint manager in communication with the fingerprint database, the fingerprint manager configured to:
    create the fingerprint in the fingerprint database, and store, for the fingerprint, a fingerprint component that represents a proximity characteristic of the femtocell; and
a proximity detector in communication with the fingerprint database, the proximity detector configured to:
    obtain location information applicable to a device;
    compare the fingerprint to the location information to determine whether to trigger a cell search; and
    initiate a current attempt to connect the device to the femtocell when the cell search is triggered.

14. The system of claim 13, where:
the proximity detector is further configured to:
increase time between subsequent attempts as remaining power supply energy decreases.

15. The system of claim 13, where:
the proximity detector is further configured to:
determine when the fingerprint has triggered more than a threshold number of failed connection attempts, and in response:
increase a time interval until initiation of a subsequent attempt to connect the device.

16. The system of claim 13, where:
the fingerprint manager is further configured to:
determine a reliability criterion for the fingerprint; and
delete the fingerprint when the reliability criterion fails a reliability threshold.

17. The system of claim 13, where:
the proximity detector is further configured to:
increase time between subsequent attempts when a prior attempt has failed.

18. The system of claim 13, where:
the fingerprint manager is further configured to:
create an additional fingerprint for the femtocell, where the additional fingerprint characterizes a different physical approach to the femtocell.

19. The system of claim 13, where:
the fingerprint component comprises a macrocell identity for a macrocell visible from the femtocell.

20. The system of claim 13, where:
the fingerprint manager is further configured to:
update the fingerprint when an update criterion is met.

21. The system of claim 20, where:
the update criterion comprises an updated frequency configuration of the femtocell, a neighboring cell, or both.

22. The system of claim 20, where:
the update criterion comprises a changed physical cell identity or a changed primary scrambling code.

23. A system comprising:
a non-volatile fingerprint memory;
a fingerprint database;
a fingerprint manager in communication with the fingerprint database, the fingerprint manager configured to:
    obtain, after power-up, a fingerprint of a local cell for a restricted subscriber group from the non-volatile fingerprint memory;
    store the fingerprint in the fingerprint database, and store, for the fingerprint, a fingerprint component comprising a proximity characteristic of the local cell;
    update the fingerprint when an update criterion is met;
    determine a reliability criterion for the fingerprint; and
    delete the fingerprint when the reliability criterion fails the reliability threshold;
a proximity detector in communication with the fingerprint database, the proximity detector configured to:
    obtain an environment characteristic applicable to a device;
    compare the fingerprint to the environmental characteristic to determine whether to trigger a cell search; and
    initiate an attempt to connect the device to the local cell when the cell search is triggered; and
where the fingerprint manager is operable to obtain the fingerprint component from any set of one or more of:
    a radio resource control input operable to convey a macrocell measurement as the fingerprint component to the fingerprint manager;
    a positioning system input operable to convey physical location information as the fingerprint component to the fingerprint manager; and
    a wireless network input operable to convey wireless access point information as the fingerprint component to the fingerprint manager.

24. The system of claim 23, where:
the proximity detector is further operable to:
perform a phased comparison to the fingerprint, including a coarse match that triggers a subsequent acquisition of additional environment characteristics; and
confirm identity of the local cell by acquiring system information.

* * * * *